(12) United States Patent
Cai et al.

(10) Patent No.: US 10,268,771 B2
(45) Date of Patent: *Apr. 23, 2019

(54) METHOD AND APPARATUS FOR PERFORMING EXTENDED SEARCH

(71) Applicant: INTERNATIONAL BUSINESS MACHINES CORPORATION, Armonk, NY (US)

(72) Inventors: Keke Cai, Beijing (CN); Hong Lei Guo, Beijing (CN); Zhong Su, Beijing (CN); Hui Jia Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

This patent is subject to a terminal disclaimer.

(21) Appl. No.: 14/730,905

(22) Filed: Jun. 4, 2015

(65) Prior Publication Data
US 2015/0269174 A1    Sep. 24, 2015

Related U.S. Application Data

(63) Continuation of application No. 13/755,297, filed on Jan. 31, 2013, now Pat. No. 9,092,480, which is a
(Continued)

(30) Foreign Application Priority Data
May 31, 2010    (CN) .......................... 2010 1 0188582

(51) Int. Cl.
G06F 17/30    (2006.01)
G06F 7/24    (2006.01)

(52) U.S. Cl.
CPC ............ G06F 17/3087 (2013.01); G06F 7/24 (2013.01); G06F 17/30241 (2013.01);
(Continued)

(58) Field of Classification Search
CPC .................................................. G06F 17/30241
(Continued)

(56) References Cited

U.S. PATENT DOCUMENTS

| 6,487,495 | B1 | 11/2002 | Gale et al. | |
| 2007/0099161 | A1* | 5/2007 | Krebs | G09B 5/00 434/322 |
| 2008/0097968 | A1* | 4/2008 | Delgado | G06F 17/30731 |
| 2008/0140348 | A1* | 6/2008 | Frank | G06F 17/3061 702/181 |

(Continued)

FOREIGN PATENT DOCUMENTS

| CN | 1845101 A1 | 10/2006 |
| CN | 101192215 A | 6/2008 |

(Continued)

*Primary Examiner* — Baoquoc N To
(74) *Attorney, Agent, or Firm* — Tutunjian & Bitetto, P.C.; Jennifer R. Davis

(57) ABSTRACT

A method and apparatus for performing extended search are provided. The method includes receiving user-inputted keywords; extending the user-inputted keywords according to geographical information to acquire extended keywords; performing a search by using the extended keywords; and returning search results to the user. With the present technical solutions, privilege control can be effectively performed in a cloud storage system. With the present embodiments, more information may be provided to a user for reference.

15 Claims, 2 Drawing Sheets

```
                                              301
    acquiring information type in the user
    inputted keywords as target functional
                attribute
                   |
                   v                          302
    acquiring geographical entities whose
    functional attributes are the target functional
    attribute according to functional attribute
    information of geographical entities
                   |
                   v                          303
    taking names of the acquired geographical
    entities as extension to the keywords
```

Related U.S. Application Data continuation of application No. 13/700,595, filed as application No. PCT/EP2011/058038 on May 18, 2011, now Pat. No. 9,020,919.

(52) U.S. Cl.
CPC .. *G06F 17/30424* (2013.01); *G06F 17/30542* (2013.01); *G06F 17/30672* (2013.01); *G06F 17/30867* (2013.01)

(58) Field of Classification Search
USPC .................. 707/706, 707, E17.018, E17.108
See application file for complete search history.

(56) References Cited

U.S. PATENT DOCUMENTS

| | | | |
|---|---|---|---|
| 2009/0157611 A1* | 6/2009 | Kipersztok | G06F 17/30672 |
| 2009/0306961 A1* | 12/2009 | Li | G06F 17/277 |
| | | | 704/9 |
| 2010/0042623 A1* | 2/2010 | Feng | G06F 17/30705 |
| | | | 707/758 |
| 2011/0099195 A1* | 4/2011 | Patwardhan | G06F 17/3084 |
| | | | 707/769 |
| 2011/0191332 A1* | 8/2011 | Barve | G06F 17/30 |
| | | | 707/723 |

FOREIGN PATENT DOCUMENTS

| | | |
|---|---|---|
| CN | 101350013 A | 1/2009 |
| EP | 2306333 A1 | 4/2011 |

* cited by examiner

METHOD AND APPARATUS FOR PERFORMING EXTENDED SEARCH

RELATED APPLICATION INFORMATION

This application is a Continuation application of co-pending U.S. patent application Ser. No. 13/755,297 filed Jan. 31, 2013, and U.S. Pat. No. 9,020,919 issued Apr. 28, 2015, incorporated herein by reference in their entirety.

TECHNICAL FIELD

The invention relates to search technology, more particularly, to a method and apparatus for performing extended searches.

BACKGROUND

One type of search performed by a user with a search engine is a location related search, for example, searching for information about a traffic condition near a certain location, searching for information about a distribution of convenience stores near a certain location, searching for information about a distribution of bus stations near a certain location, etc. A location can be represented by coordinates or by location name. Since most existing search engines are text based, location name is often used to represent a location. According to a general solution, a user enters keywords in an interface provided by a search engine. The keywords include a location name such as "Summer Palace"; the keywords also include an information type to be learned, such as "traffic condition". The search engine searches content containing strings "Summer Palace" and "traffic condition" and returns the content back to the user as results. Some search engine may perform extension on keywords and take the extended keywords as keywords that are actually used. For example, according to one type of literal extension, "traffic condition" may be extended as "traffic" and "condition", so that not only content containing string "traffic condition" is acquired, but also content only containing string "traffic" or "condition" are also acquired. According to one type of semantic extension, for example, "traffic condition" is extended into "traffic situation", "traffic problem" etc. Literal extension and semantic extension may be combined together so as to return more search results to the user. These solutions all take a location name as a text attribute. However, a location is also a kind of geographical information. There is a need for a solution to use geographical information in a search related to locations.

SUMMARY

In view of the foregoing, embodiments of the invention provide a method and apparatus for performing extended searches.

A method for performing extended searches according to an embodiment of the invention comprises: receiving user-inputted keywords; extending the user-inputted keywords according to geographical information to acquire extended keywords; performing a search by using the extended keywords; and returning search results to the user.

A method for performing extension on keywords according to an embodiment of the invention comprises: receiving keywords; extracting a location name in the keywords; transmitting the location name to a geographical information system for the geographical information system to determine a target geographical entity referred to by the location name and acquire adjacent geographical entities of the target geographical entity; receiving names of the adjacent geographical entities returned by the geographical information system as an extension to the keywords.

A method for performing extension on keywords according to an embodiment of the invention comprises: receiving keywords; extracting information type in the keywords; transmitting the information type to a geographical information system for the geographical information system to determine geographical entities whose functional attributes are the information type; receiving names of the geographical entities returned by the geographical information system as an extension to the keywords.

An apparatus for performing extended searches according to an embodiment of the invention comprises: a receiving module configured to receive user-inputted keywords; an extending module configured to extend the user-inputted keywords according to geographical information to acquire extended keywords; a searching module configured to perform searches by using the extended keywords; and a returning module configured to return search results to the user.

With technical solutions according to embodiments of the invention, keywords may be further extended. When a user performs a location related search, it is likely that not only information of the location itself is needed, but also information near that location is needed. Therefore, when keywords are further extended with geographical information, content searched by a search engine containing the extended keywords may also be what is needed by the user. Thus, a search service can be provided to a user more efficiently.

DETAILED DESCRIPTION OF THE PREFERRED EMBODIMENTS

Figure 1:
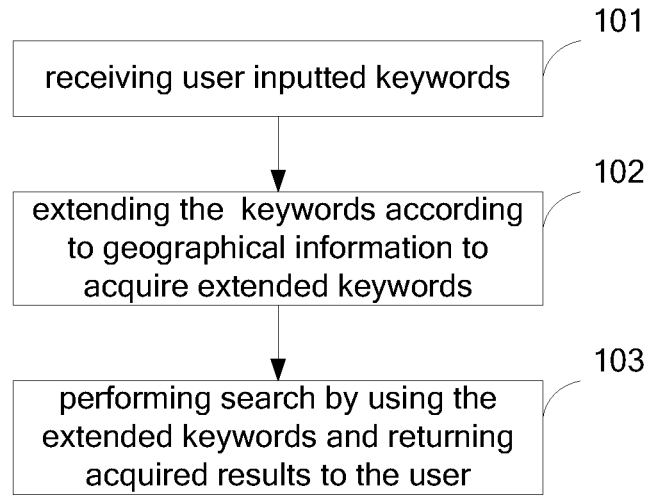
FIG. 1 is a flowchart of a method for performing extended searches according to an embodiment of the invention.

Embodiments of the invention will be described below with reference to drawings. Hereinafter, many specific details are explained so as to understand the invention thoroughly. However, those skilled in the art can readily appreciate that, the implementation of the invention may not have some of the specific details, and the invention is not limited to the described specific embodiments. Rather, it may be considered to use any combination of the below features and elements to implement the invention regardless of whether they relate to different embodiments. Thus, the aspects, features, embodiments and advantages below are merely illustrative and should not be construed as elements or definitions of the appended claims, unless otherwise explicitly specified in claims. It should also be noted that, in order to avoid obscuring the invention with unnecessary details, only means structures and/or process steps that are closely associated with the solution of the invention are illustrated in the drawings, and other details that have little relationship therewith are omitted. Further, except that "direct" or "indirect" are intentionally used to define, the connection in the application document includes both direct and indirect connections.

When a user performs location related searches, keywords entered by the user include location name and information type to be learned. However, existing literal or semantic extension approaches may have greater limitation in helping a user to find the needed information.

As to location name, what is actually desired by the user is information within a certain range of that location. Further, two adjacent locations may have some similar characteristics or characteristics that influence each other, such that information about one location may be referenced by or supplemental to information about another location. For example, when a user enters "Summer Palace" and "traffic condition" as keywords to be searched for, the user not only wants to know traffic conditions of the location point "Summer Palace", but also traffic conditions of some adjacent location points near Summer Palace, such as XiYuan, LiuLangZhuang, QingLongQiao. In fact, a traffic condition near Summer Palace will have more reference value to a user. However, according to traditional literal or semantic extension approaches, a traffic condition about these adjacent location points cannot be found, because "Summer Palace" and "XiYuan", "Summer Palace" and "LiuLangZhuang" or "Summer Palace" and "QingLongQiao" have little literal or semantic association.

Similarly, as to the information type, information that is really useful to a user may not match with keywords input by the user or even keywords on which literal or semantic extension have been performed. For example, when a user enters a location name and "catering" as keywords to search for catering information near the location, content containing strings "dining", "beverage", etc. that literally relate to "catering" may be found, or content containing strings "eat dinner", "drink water", etc. that semantically relate to "catering" may be found, but it is likely that content only containing a name of restaurant, a name of shop (such as DongLaiShun, QuanJinCheng) cannot be found.

According to embodiments of the invention, user-input keywords are extended by using geographical information. Geographical information is information related to geography. A basic unit of geographical information is geographical entity, for example, scenic spot, convenience store, bus station, restaurant, etc., all correspond to geographical entities respectively. These geographical entities have different functional attributes. Geographical information includes information about functional attributes of the geographical entity, namely, functional attribute information. Geographical information also includes or may be used to deduce information about distance between two geographical entities, namely, distance information. The user-input keywords are extended by using geographical information so as to find more content that will be useful to the user by utilizing a search engine.

Each geographical entity has a corresponding location on a map. As mentioned above, a location can be represented by coordinates or by location name. Generally, the location name corresponding to a geographical entity is the name of the geographical entity. For example, the location name "Summer Palace" is also actually the name of a geographical entity whose attribute is a scenic spot. For another example, the location name "Patent Office" is also actually the name of a geographical entity whose attribute is a government agency. Location name and name of a geographical entity have similar meanings in the present application.

Referring to FIG. 1, a flowchart of a method for performing extended search according to an embodiment of the invention is shown.

At step 101, user-input keywords are received.

The method for performing extended searches according to an embodiment of the invention may be performed by a search server. In certain embodiments, the search server provides to a search client that is connected thereto via network document (such as HTML document) that may be parsed by a browser running on the search client. The browser parses the document to generate a user interface so that user can input the keywords via the user interface. When the user indicates completion of input by any means, the search client sends the keywords to the search server. In this way, the search server can receive keywords submitted by the user via network. The search server can run a search engine thereon to search for content containing keywords. The user-inputted search string may contain symbols of Boolean expression supported by the search engine, such as AND, OR, etc.

As mentioned before, keywords for searching for a location generally include two parts: location name and information type. Next, for the purpose of illustration, assume that user-inputted keywords are: Summer Palace catering. In the keywords, location name is "Summer Palace", and information type is "catering".

At step 102, the keywords are extended according to geographical information to acquire extended keywords.

According to an embodiment of the invention, the location name may be extended through geographical information about distance between two geographical entities, namely, distance information. According to another embodiment of the invention, the information type may be extended through information about a functional attribute of a geographical entity, namely, functional attribute information. The detailed extension process will be described below in detail. Those skilled in the art may also extend the keywords by employing other geographical information or in another manner to acquire extended keywords based on the illustrative embodiment herein.

Functions such as collecting, storing, editing, processing, analyzing and outputting geographical information, etc. may be accomplished by a geographical information module. Performing extension on the keywords according to geographical information may be accomplished by a keyword extending module. The search engine invokes the keyword extending module. The keyword extending module queries the geographical information module to acquire geographical information, performs the extension, and then returns the extended keywords to the search engine. According to an embodiment of the invention, the geographical information module, the keyword extending module and the search engine are integrated in a same application. According to another embodiment of the invention, the search engine module, the keyword extending module and the geographical information module are three independent modules. In this case, the geographical information module is equivalent to a geographical information system (GIS). The invention is not limited to the particular combination manner of these three modules.

At step 103, a search is performed by using the extended keywords, and the acquired results are returned to the user.

The extension of user-inputted keywords may form multiple keywords. The search engine searches these extended keywords to find content containing these keywords. Those skilled in the art can appreciate that these extended keywords may be further extended in a manner of literal extension or semantic extension before a search is performed.

Figure 2:
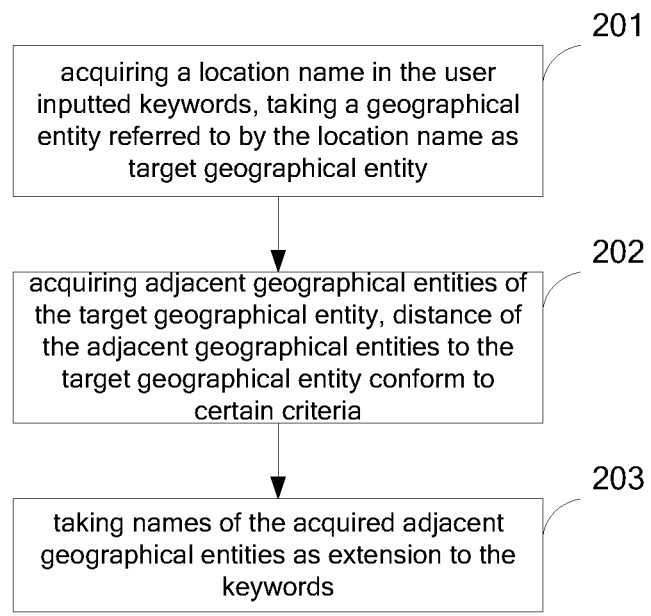
FIG. 2 is a flowchart of extending keywords with geographical information according to an embodiment of the invention.

A solution for performing extension on keywords by using geographical information according to an embodiment of the invention will be described below with reference to FIG. 2. Steps shown in FIG. 2 may be performed by a keyword extending module.

At step 201, a location name in the user-inputted keywords is acquired so as to determine a geographical entity referred to by the location name as the target geographical entity.

Keywords for searching for a location generally include two parts: location name and information type. In the above example, assume that user-inputted keywords are: Summer Palace catering. In the keywords, location name is "Summer Palace". The keyword extending module may extract "Summer Palace" from the keywords as the target geographical entity.

Before the keyword extending module receives the keywords submitted by the user, it does not know whether the keywords contain therein a location name, that is, name of a geographical entity. A list of names of geographical entities may be maintained. If a name of a geographical entity in the list is found in the keywords, then name of the geographical entity will be extracted. In fact, some existing search engines can already automatically provide map service if the user-submitted keywords contain location name, which means that identification and extraction of a location name in keywords are already realized. Thus, how to identify and extract a name of a geographical entity from keywords will not be described here for brevity.

In some cases, the location name inputted by user may not match exactly with the name of a geographical entity. The location name may be extended via a manner of literal extension or semantic extension. The extended location name may match with a name of a geographical entity, and that geographical entity may also be the target geographical entity.

At step 202, adjacent geographical entities of the target geographical entity are acquired, wherein the distance of the adjacent geographical entities to the target geographical entity conform to certain criteria.

As mentioned before, geographical information also includes or may be used to deduce information about the distance between two geographical entities, namely, distance information. According to an embodiment of the invention, the distance information is straight-line distance information, that is, straight-line distance between two geographical entities on a map. The straight-line distance can intuitively reflect a mutual relationship between two geographical entities. Intuitively, the closer the distance between two geographical entities, the more valuable the information about one geographical entity will be as the reference and supplementation to information about another geographical entity. Data transfer amount and calculation amount for geographical entities may be reduced by employing straight-line distance of geographical entities, this is because the straight-line distance may be calculated by simply obtaining coordinates of the two geographical entities each time a calculation is performed.

According to another embodiment of the invention, the distance information is path distance information, that is, length of a path segment connecting two geographical entities. In comparison to straight-line distance, path distance further considers reachability between geographical entities. If the straight-line distance between two geographical entities is very short but the path distance is very long, the value of information about one geographical entity as reference or supplementation to information about another geographical entity may actually be very small. For example, distance between two geographical entities at different sides of a river is approximately the width of the river. However, in case there is no water transportation vehicle, the path distance thereof is the distance to and from the nearest bridge plus the width of the river. If information about one geographical entity (for example, shopping place) is to be searched, then obviously, the reference value of the shopping place information about another geographical entity is very little.

According to still another embodiment of the invention, the distance information is time distance information, that is, the time needed to travel from one geographical entity to another geographical entity along the path segment. This embodiment further considers characteristics of different path segments. For example, to travel from one geographical entity to another geographical entity, the time needed to take rail transit connecting two geographical entities is shorter than that of road transportation, and the time needed to take freeway is shorter than that of ordinary road. However, rail transit is limited in a setting of stations, and a freeway is limited in a setting of entrances and exits. Relevance between two geographical entities may be reflected more accurately by comprehensively considering these path segment characteristics.

Those skilled in the art can readily appreciate that, a combination of straight-line distance information, path distance information and time distance information, such as weighted combination, may be used as distance between two geographical entities. In the above example, location name is "Summer Palace", which also refers to a geographical entity. According to geographical information, straight-line distance between geographical entities XiYuan, LiuLangZhaung, QingLongQiao, etc. and geographical entity Summer Palace is shorter than a straight-line distance threshold; there is a subway connecting between geographical entity, ZhongGuangCun, and geographical entity, Summer Palace, time distance thereof is smaller than a time distance threshold; and although straight-line distance between geographical entity, Summer Palace, and geographical entity, YuFeng Tower, is short, there is no path connecting these two geographical entities. Accordingly, it can be considered that the distance of XiYuan, LiuLangZhaung, QingLongQiao, ZhongGuangCun to the Summer Palace complies with said criteria, and thus they are all adjacent geographical entities of the geographical entity, Summer Palace.

In addition, those skilled in the art can also readily devise other metrics as distance between the geographical entities.

At step 203, names of adjacent geographical entities acquired in step 202 are taken as extensions to the keywords.

The example of keywords listed above is "Summer Palace catering". In step 202, the acquired geographical entities are XiYuan, LiuLangZhuang, QingLongQiao and ZhongGuangCun, so that "XiYuan", "LiuLangZhuang", "QingLongQiao", "ZhongGuangCun" are taken as extensions to the keywords. The extended keywords may be "XiYuan catering", "LiuLangZhuang catering", "QingLongQiao catering", "ZhongGuangCun catering" etc. Thus, the keywords are extended according to distance information in geographical information.

When the keyword extending module and the geographical information module are two independent modules, the keyword extending module transmits the extracted location name, optionally after literal extension or semantic extension, to the geographical information module for it to determine a target geographical entity referred to by the location name or the literally or semantically extended location name and acquire adjacent geographical entities of the target geographical entity. The keyword extending module then receives names of the adjacent geographical entities returned by the geographical information module. Finally, the keyword extending module transmits the extended keywords to the search engine to search for content containing the extended keywords.

In some cases, there are so many names of adjacent geographical entities returned by the geographical information module that they exceed a threshold of the number of names of adjacent geographical entities. If the search engine performs search with these over-numbered names of adjacent geographical entities, then search results returned to user may instead be adverse to obtain useful information by user. The keyword extending module may filter the names of adjacent geographical entities returned by the geographical information module. According to an embodiment of the invention, the keyword extending module sorts names of the adjacent geographical entities according to certain criteria, then selects names of adjacent geographical entities at the front of sorting and sends them to the search engine.

According to an embodiment of the invention, the sorting may be performed by taking the distance of adjacent geographical entities to target geographical entity as the criteria. In the above listed example, location name is "Summer Palace", which also refers to a geographical entity. Distance of the geographical entities XiYuan, LiuLangZhaung, QingLongQiao, ZhongGuangCun to Summer Palace comply with certain criteria, and thus they are all adjacent geographical entities of the target geographical entity Summer Palace. As mentioned before, distance between geographical entities may be at least one of straight-line distance, path distance information and time distance information. Straight-line distance may be taken as sorting criteria. For example, assume that according to geographical information, straight-line distance between XiYuan and Summer Palace is the shortest, then LiuLangZhaung, and then QingLongQiao, and the distance between ZhongGuangCun and Summer Palace is the longest. When the threshold of the number of names of adjacent geographical entities is 2, the keyword extending module only transmits XiYuan and LiuLangZhaung to the search engine. To realize the sorting by taking distance between adjacent geographical entities and target geographical entity as the criteria, the geographical information module, when transmitting names of adjacent geographical entities to the keyword extending module, needs to additionally transmit distance information between adjacent geographical entities and target geographical entity for the keyword extending module to perform sorting.

In addition, at step 103, the search engine returns the acquired search results to user after performing search according to the extended keywords. A page in which search results are returned to user can only display a limited number of search results. According to an embodiment of the invention, the search results are sorted so as to display to user search results that are most useful to user at relatively front position, thereby increasing speed at which user acquires useful information. Similarly, the search engine may sort search results according to distance information between adjacent geographical entities and target geographical entity. In the above example, assume according to geographical information, straight-line distance between XiYuan and Summer Palace is the shortest, then LiuLangZhaung, and then QingLongQiao, and distance between ZhongGuangCun and Summer Palace is the longest. Then, when returning search results to a user, the search engine can place content containing "LiuLangZhaung" at front position. In order to enable the search engine to perform sorting on a search structure according to the distance information, the keyword extending module, when it transmits the extended keywords to the search engine, needs to additionally transmit distance information between corresponding adjacent geographical entities and target geographical entity. If names of adjacent geographical entities have already been sorted by the keyword extending module, then the keyword extending module may also sends the sorting information to the search engine.

Figure 3:
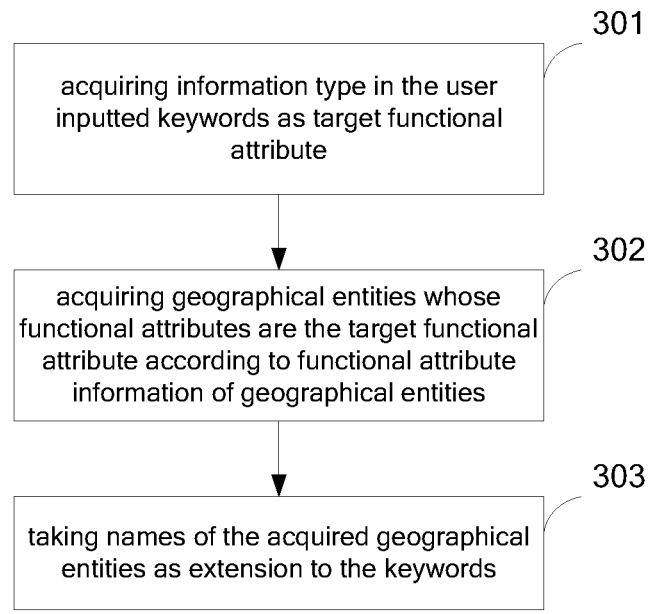
FIG. 3 is a flowchart of extending keywords with geographical information according to an embodiment of the invention.

A solution for performing extension on keywords by using geographical information according to another embodiment of the invention will be described below with reference to FIG. 3.

At step 301, information type in user-inputted keywords is acquired as target functional attribute.

In the above example, assume that the user-inputted keywords are: Summer Palace catering. In the keywords, information type is "catering". From the perspective of geographical information, what the user looks for are geographical entities whose functional attribute are "catering". The keyword extending module can extract "catering" from the keywords as target functional attribute.

Before the keyword extending module receives the keywords submitted by the user, it does not know whether the keywords contain therein information type corresponding to functional attributes of geographical entities. A list recording various functional attributes may be maintained. If a functional attribute recorded in that list is found in the keywords, then information type is extracted.

In some cases, the information type inputted by user may not match exactly with some functional attribute. The information type may be extended via manner of literal extension or semantic extension. The extended information type may match with some functional attribute. That functional attribute may also be the target functional attribute.

At step 302, geographical entities whose functional attributes are the target functional attribute are acquired according to functional attribute information of the geographical entities.

The example of the above listed keywords is "Summer Palace catering". The target functional attribute acquired in step 301 is catering. Here, assume the acquired geographical entities whose functional attributes are "catering" include DongLaiShun, FuJianShaXian snack, QuanJinCheng, TingLiGuan restaurant, Summer Palace dock restaurant.

At step 303, names of the geographical entities acquired in step 302 are taken as extension to the keywords.

In the geographical entities acquired in step 302, names of some geographical entities include keywords that might be acquired by performing literal extension or semantic extension on "catering", such as FuJianShaXian snack, TingLiGuan restaurant, Summer Palace dock restaurant. However, names of some other geographical entities do not include keywords that might be acquired by performing literal extension or semantic extension on "catering", such as DongLaiShun, QuanJinCheng. Names of these geographical entities can be linked to user-inputted keywords only through functional attribute information in geographical information. Thus, the keywords may be extended through functional attribute information, and such keywords as "Summer Palace DongLaiShun", "Summer Palace QuanJinCheng" are acquired.

In practice, it is possible to merely acquire geographical entities whose functional attribute is the target functional attribute and whose distance to the target geographical entity satisfies certain criteria in step 302.

When the keyword extending module and the geographical information module are two independent modules, the keyword extending module transmits the extracted information type or extended information type to the geographical information module for it to determine geographical entity that takes the information type or the extended information type as functional attribute. The keyword extending module then receives names of the acquired geographical entities returned by the geographical information module. Finally, the keyword extending module transmits the extended keywords to the search engine to search for content containing the extended keywords.

In the above two embodiments, user-inputted keywords are extended through distance information and functional attribute information in geographical information respectively. Those skilled in the art may also perform extension on keywords by using other geographical information or other manner according to the illustrative embodiments herein, so as to acquire the extended keywords.

Whether the extension is appropriate may be further judged according to subsequent action of the user. According to embodiments of the invention, a search engine can tell user extension results of keywords when returning search results to the user. For example, the following phrase may be displayed to a user: your inputted keywords "Summer Palace catering" have been extended. "Summer Palace" has been extended into "XiYuan", "LiuLangZhuang", "QingLongQiao" and "ZhongGuanCun"; "catering" has been extended into "DongLaiShun" and "QuanJinCheng". An interface may be provided to the user based on this for the user to directly comment whether the extension is appropriate. According to another embodiment of the invention, whether the extension is appropriate is indirectly commented according to user's actual click on search results. For example, if a user makes more clicks on a link to content containing "XiYuan restaurant", then it means that the extension is relatively appropriate.

Figure 4:
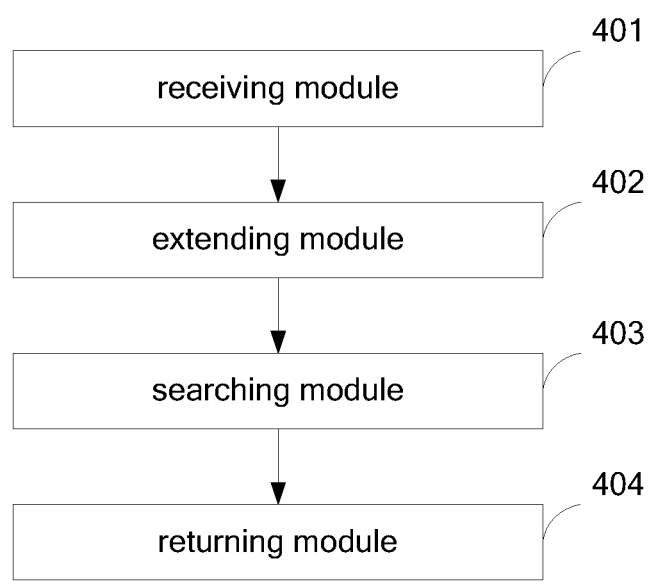
FIG. 4 is a block diagram of an apparatus for performing extended searches according to an embodiment of the invention.

FIG. 4 is a block diagram of an apparatus for performing extended search according to an embodiment of the invention.

As shown in FIG. 4, the apparatus for performing extended search according to an embodiment of the invention comprising:
- a receiving module 401 configured to receive user-inputted keywords;
- an extending module 402 configured to extend the user-inputted keywords according to geographical information to acquire extended keywords;
- a searching module 403 configured to perform search by using the extended keywords; and
- a returning module 404 configured to return search results to the user.

Those skilled in the art can appreciate that, the above method and system may be implemented by computer executable instructions and/or control codes contained in a processor, for example, such codes are provided on carrier medium such as magnetic disk, CD or DVD-ROM, programmable memory such as read-only memory (firmware) or data carrier such as optical or electronic signal carrier. The apparatus of the present embodiment for performing extended search and components thereof may be implemented by hardware circuit such as large scale integrated circuit or gate arrays, semiconductors such as logic chip or transistors, or programmable hardware devices such as field programmable gate array, programmable logic device, or can be implemented in form of various processors executing corresponding software, or can be implemented by a combination of the above hardware circuit and software such as firmware.

Although several exemplary embodiments of the invention have been illustrated and described, those skilled in the art will appreciate that changes may be made to these embodiments without departing from the scope of the invention. The scope of the invention is defined by the appended claims and their equivalent transformations.

The invention claimed is:

1. An apparatus for performing an extended search, comprising:
   a processor operatively coupled to a computer-readable storage medium, the processor being configured to:
   extend user-inputted keywords to generate extended keywords by one or more of a literal or a semantic extension;
   search with the processor by using the extended keywords;
   acquire a location name in the user-inputted keywords and determine a geographical entity referred to by the location name as a target geographical entity;
   acquire adjacent geographical entities of the target geographical entity and take names of the adjacent geographical entities as an extension to the keywords; and
   return search results to the user.

2. The apparatus of claim 1, wherein a distance between the adjacent geographical entities to the target geographical entity satisfies a criterion.

3. The apparatus of claim 2, wherein the distance is at least one of the following:
   straight-line distance, path distance and arrival-time distance.

4. The apparatus of claim 2, wherein the processor is further configured to:
   sort the adjacent geographical entities according to the corresponding distance to the target geographical entity;
   select adjacent geographical entities at a front of sorting, wherein the number of the selected adjacent geographical entities is a threshold of the number of names of adjacent geographical entities; and
   take names of the selected adjacent geographical entities as an extension to the keywords.

5. The apparatus of claim 2, wherein the processor is further configured to:
   return search results to the user after the search results have been sorted according to a distance between the corresponding selected adjacent geographical entities to the target geographical entity, wherein the search results at the front correspond to names of adjacent geographical entities that are nearer to the target geographical entity.

6. The apparatus of claim 1, wherein the processor is further configured to:
   acquire an information type in the user-inputted keywords as a target functional attribute;
   acquire geographical entities whose functional attributes are the target functional attribute; and
   take names of the acquired geographical entities as an extension to the keywords.

7. The apparatus of claim 1, wherein the processor is further configured to:

judge whether the extension IS appropriate according to a subsequent action of the user.

8. An apparatus for performing an extended search, comprising:

a processor operatively coupled to a computer-readable storage medium, the processor being configured to:

extend the user-inputted keywords to generate extended keywords and to acquire an information type in the user-inputted keywords as a target functional attribute;

perform a search with the processor by using the extended keywords;

acquire a location name in the user-inputted keywords and determine a geographical entity referred to by the location name as a target geographical entity;

acquire adjacent geographical entities of the target geographical entity and take names of the adjacent geographical entities as an extension to the keywords; and return search results to the user.

9. The apparatus of claim 8, wherein a distance between the adjacent geographical entities to the target geographical entity satisfies a criterion.

10. The apparatus of claim 9, wherein the distance is at least one of the following:

straight-line distance, path distance and arrival-time distance.

11. The apparatus of claim 9, wherein the processor is further configured to:

sort the adjacent geographical entities according to the corresponding distance to the target geographical entity;

select adjacent geographical entities at a front of sorting, wherein the number of the selected adjacent geographical entities is a threshold of the number of names of adjacent geographical entities; and take names of the selected adjacent geographical entities as an extension to the keywords.

12. The apparatus of claim 9, wherein the processor is further configured to:

return search results to the user after the search results have been sorted according to a distance between the corresponding selected adjacent geographical entities to the target geographical entity, wherein the search results at the front correspond to names of adjacent geographical entities that are nearer to the target geographical entity.

13. The apparatus of claim 8, wherein the processor is further configured to:

acquire geographical entities whose functional attributes are the target functional attribute; and take names of the acquired geographical entities as an extension to the keywords.

14. The apparatus of claim 8, wherein the processor is further configured to:

judge whether the extension IS appropriate according to a subsequent action of the user.

15. The apparatus of claim 9, wherein the processor is further configured to generate extended keywords by one or more of a literal or a semantic extension.

* * * * *